(12) United States Patent
Stationwala et al.

(10) Patent No.: US 12,483,357 B2
(45) Date of Patent: Nov. 25, 2025

(54) RETRY MECHANISM FOR LOW ENERGY COMMUNICATIONS

(71) Applicant: Silicon Laboratories Inc., Austin, TX (US)

(72) Inventors: Hasan Ali Stationwala, Hyderabad (IN); Ayan Ghosh, Hyderabad (IN); Deepak Pancholi, Bangalore (IN)

(73) Assignee: Silicon Laboratories Inc., Austin, TX (US)

( * ) Notice: Subject to any disclaimer, the term of this patent is extended or adjusted under 35 U.S.C. 154(b) by 277 days.

(21) Appl. No.: 18/168,815

(22) Filed: Feb. 14, 2023

(65) Prior Publication Data

US 2024/0275525 A1    Aug. 15, 2024

(51) Int. Cl.
*H04L 1/1812*    (2023.01)
*H04L 5/00*    (2006.01)
*H04W 4/80*    (2018.01)

(52) U.S. Cl.
CPC .......... *H04L 1/1816* (2013.01); *H04L 5/0055* (2013.01); *H04W 4/80* (2018.02)

(58) Field of Classification Search
CPC ... H04L 1/1816; H04L 5/0055; H04L 1/1692; H04L 2001/0093; H04W 4/80
See application file for complete search history.

(56) References Cited

U.S. PATENT DOCUMENTS

| | | | |
|---|---|---|---|
| 6,032,211 A | 2/2000 | Hewitt | |
| 6,148,357 A | 11/2000 | Gulick | |
| 6,973,067 B1 | 12/2005 | Haartsen | |
| 2009/0201827 A1 | 8/2009 | Kwon | |
| 2010/0054243 A1 | 3/2010 | Stone | |
| 2012/0151537 A1 | 6/2012 | Singh | |
| 2012/0281704 A1 | 11/2012 | Butterworth | |
| 2019/0104079 A1 | 4/2019 | Wang | |
| 2021/0160009 A1 | 5/2021 | Goyal | |
| 2022/0030505 A1 | 1/2022 | Lee et al. | |

(Continued)

FOREIGN PATENT DOCUMENTS

WO    WO-2024071871 A1 *    4/2024

OTHER PUBLICATIONS

Bluetooth®, "Architecture, Mixing, and Conventions," Specification of the Bluetooth® System, vol. 1, Revision 7. 5.3, Revision Date Jul. 13, 2021, 202 pages.

(Continued)

*Primary Examiner* — Austin J Moreau
(74) *Attorney, Agent, or Firm* — Zagorin Cave LLP (57) ABSTRACT

A retry technique reduces or eliminates redundant transmit streams and redundant retransmissions when multiple devices are listening to the same audio stream. The retry techniques reduce power consumption and reduce airtime usage. The retry technique includes communicating data using a hybrid isochronous group including a plurality of broadcast isochronous streams from a source device to a plurality of sink devices. The hybrid isochronous group includes, for each broadcast isochronous stream, a group of connected isochronous streams including a connected isochronous stream to the source device from each of the plurality of sink devices. The broadcast isochronous streams communicate the data and the connected isochronous streams communicate acknowledgements of receiving the data.

20 Claims, 8 Drawing Sheets

(56) References Cited

U.S. PATENT DOCUMENTS

| | | | |
|---|---|---|---|
| 2022/0078623 A1 | 3/2022 | Kondarreddy | |
| 2022/0200716 A1 | 6/2022 | Bonde | |
| 2022/0400503 A1 | 12/2022 | Cavalcanti | |
| 2023/0224078 A1* | 7/2023 | Abildgren | H04L 1/0041 714/758 |
| 2024/0155711 A1* | 5/2024 | Chuo | H04W 76/14 |
| 2024/0396849 A1* | 11/2024 | Lee | H04L 12/40 |
| 2025/0048460 A1 | 2/2025 | Lee | |

OTHER PUBLICATIONS

Bluetooth®, "Low Energy Controller," Specification of the Bluetooth® System, vol. 6, Revision v. 5.3, Revision Date Jul. 13, 2021, 422 pages.

Bluetooth Generic Audio Working Group, "Basic Audio Profile," Bluetooth® Profile Specification, Revision v1.0.1, Revision Date Jun. 21, 2022, 148 pages.

Hunn, N., "Introducing Bluetooth®, LE Audio," published Jan. 2022, downloaded from www.bleaudio.com on Nov. 21, 2022, 315 pages.

Silicon Labs, "UG434: Silicon Labs Bluetooth ® C Application Developer's Guide for SDK v3.x and Higher," Revision 1.0, downloaded from silabs.com on Sep. 13, 2022, 35 pages.

Silicon Labs, "UG103.14: Bluetooth® LE Fundamentals," Revision 0.7, downloaded from silabs.com on Sep. 13, 2022, 21 pages.

Townsend, K., "Introduction to Bluetooth Low Energy," downloaded from https://learn.adafruit.com/introduction-to-bluetooth-low-energy, Feb. 14, 2022, 10 pages.

Woolley, M., "The Bluetooth® Low Energy Primer," Version 1.0.4, Jun. 6, 2022, 87 pages.

Woolley, M., "Bluetooth Core Specification Version 5.2 Feature Overview," Version 1.0.1, Dec. 9, 2020, 37 pages.

Bluetooth®, "Bluetooth Core Specification," Version: v5.4, Jan. 31, 2023, by Core Specification Working Group, vol. 1, Part A, §§ 3.4 and 3.5, 20 pages.

Bluetooth®, "Bluetooth Core Specification," Version: v5.4, Jan. 31, 2023, by Core Specification Working Group, vol. 6, Part B, §§ 4.4 and 4.5, 89 pages.

Kanafek, P., "What's New in Bluetooth v5.4: An Overview," Blogs—Nordic Blog—Nordic DevZone, webpage <https://devzone.nordicsemi.com/nordic/nordic-blog/b/blog/posts/whats-new-in-bluetooth-v5-4-an-overview> on Feb. 15, 2023, 7 pages.

* cited by examiner

RETRY MECHANISM FOR LOW ENERGY COMMUNICATIONS

BACKGROUND

Field of the Invention

This disclosure relates to communications systems in general, and more particularly to radio frequency (RF) communications systems.

Description of the Related Art

Bluetooth™ Low Energy (BLE) is an exemplary communications protocol designed for low power and low latency applications. In general, BLE specifications support isochronous data transactions (e.g., a Connected Isochronous Stream (CIS) or a Broadcast Isochronous Stream (BIS)) and asynchronous data transactions (e.g., Asynchronous Connection Link (ACL) transactions). Isochronous transactions may be used for latency-sensitive data, i.e., time-bound data for time-synchronized processing (e.g., real time voice or audio streaming) that should be transmitted at a constant rate. The data has a time-limited validity period, at the end of which it is said to expire. Expired data that has not yet been transmitted is discarded. Receiving devices only receive data that is valid with respect to rules regarding its age and acceptable latency. Isochronous data transactions ensure that multiple sink devices receiving data from the same source, will render it at the same time. An upper layer of the BLE protocol stack typically uses an isochronous data channel for constant data throughput and periodicity of communication of real time audio data.

In a conventional BLE system, a BIS is associated with isochronous transactions that have a single BLE audio source device and one or more BLE audio sink devices. The BLE audio source device only transmits data, and a BLE audio sink device only receives data. The BIS does not include a feedback path from a sink device to the source device. The source device retransmits each audio packet N times to increase reliability, where N is a positive integer greater than one. The source device retransmits a packet even if all sink devices successfully received the packet. Thus, BIS can be an inefficient use of the communications channel and power consumption. In the conventional BLE system, a CIS has a single audio source device and one or more audio sink devices. Multiple synchronized CISes form a Connected Isochronous Group (CIG). The source device transmits audio packets to each sink device individually. A sink device acknowledges successful reception of a prior transmission. The source device does not retransmit audio packets to a sink device if a transmission was acknowledged. In scenarios where two or more sink devices listen to same audio stream (e.g., audio streaming from a television to multiple hearing aid devices present in the same vicinity), redundant transmit streams cause airtime and power inefficiencies. Accordingly, improved techniques for communicating isochronous data are desired.

SUMMARY OF EMBODIMENTS OF THE INVENTION

In at least one embodiment, a method for communicating between devices using a wireless communications interface includes communicating data packets using a hybrid isochronous group including a plurality of broadcast isochronous streams from a source device to a plurality of sink devices. The hybrid isochronous group includes, for each broadcast isochronous stream, a group of connected isochronous streams including a connected isochronous stream to the source device from each of the plurality of sink devices. The broadcast isochronous streams communicate the data packets, and the connected isochronous streams communicate acknowledgements of receiving the data packets. The method may further include, for each broadcast isochronous stream of the plurality of broadcast isochronous streams: broadcasting a first data packet of the broadcast isochronous stream by the source device, listening by the source device for an acknowledgment from each of the plurality of sink devices, and selectively retransmitting the first data packet by the source device based on whether an acknowledgement is received from each of the plurality of sink devices.

In at least one embodiment, a wireless communications system includes a source device including an RF transceiver configured to transmit and receive radio frequency signals. The source device includes data processing circuitry configured to provide a plurality of broadcast isochronous streams to the RF transceiver and to detect for each broadcast isochronous stream, a group of connected isochronous streams including a connected isochronous stream from each of a plurality of sink devices. The plurality of broadcast isochronous streams communicates data packets to the plurality of sink devices and the group of connected isochronous streams communicate acknowledgements from the plurality of sink devices. The plurality of broadcast isochronous streams and the group of connected isochronous streams for each broadcast isochronous stream form a hybrid isochronous group.

In at least one embodiment, a wireless communications system includes a sink device. The sink device includes an RF transceiver configured to transmit and receive radio frequency signals. The sink device includes data processing circuitry configured to detect a plurality of broadcast isochronous streams from the RF transceiver and to provide to the RF transceiver for each broadcast isochronous stream, a connected isochronous stream. The plurality of broadcast isochronous streams communicates data packets to the sink device and the connected isochronous streams communicate acknowledgements from the sink device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
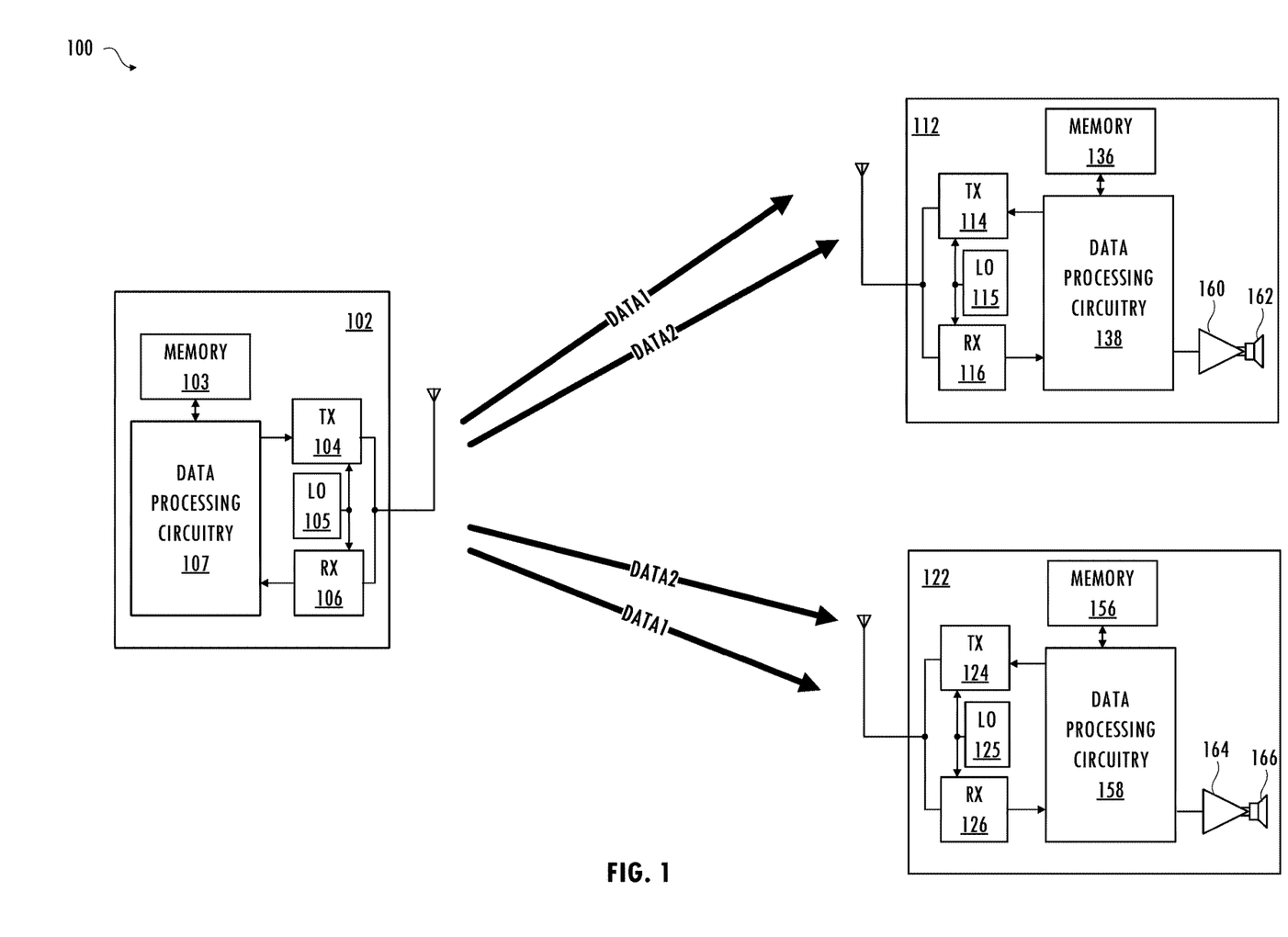
FIG. 1 illustrates a functional block diagram of an exemplary wireless communications system.

Referring to FIG. 1 in at least one embodiment, wireless communications system 100 includes wireless communications device 102, wireless communications device 112, and wireless communications device 122, which are devices compliant with the BLE standardized communications protocol designed for low power and low latency applications. Wireless communications device 102 includes transmitter 104, receiver 106, data processing circuitry 107, memory 103, and local oscillator 105. Wireless communications device 112 includes transmitter 114, receiver 116, data processing circuitry 138, memory 136, and local oscillator 115. Wireless communications device 122 includes transmitter 124, receiver 126, data processing circuitry 158, memory 156, and local oscillator 125. Local oscillator 105, local oscillator 115, and local oscillator 125 provide signals used in transceiver functions of wireless communications device 102, wireless communications device 112, and wireless communications device 122, respectively.

In at least one embodiment of wireless communications device 112, transmitter 114, receiver 116, local oscillator 115, data processing circuitry 138, and memory 136 are included in a controller implementing a physical layer, which controls radio frequency communications, and a link layer of a BLE device. In an embodiment of wireless communications system 100, wireless communications device 112 and wireless communications device 122 are BLE audio devices (e.g., earbuds) and data processing circuitry 138 and data processing circuitry 158 provide signals to driver 160 and driver 164, respectively, which drive transducer 162 and transducer 166, respectively, to generate audio signals. In some embodiments, wireless communications device 112 and wireless communications device 122 are hearing aid devices and include at least one microphone (not shown), telecoil, or sensor coupled to data processing circuitry 138 or data processing circuitry 158.

Figure 2:
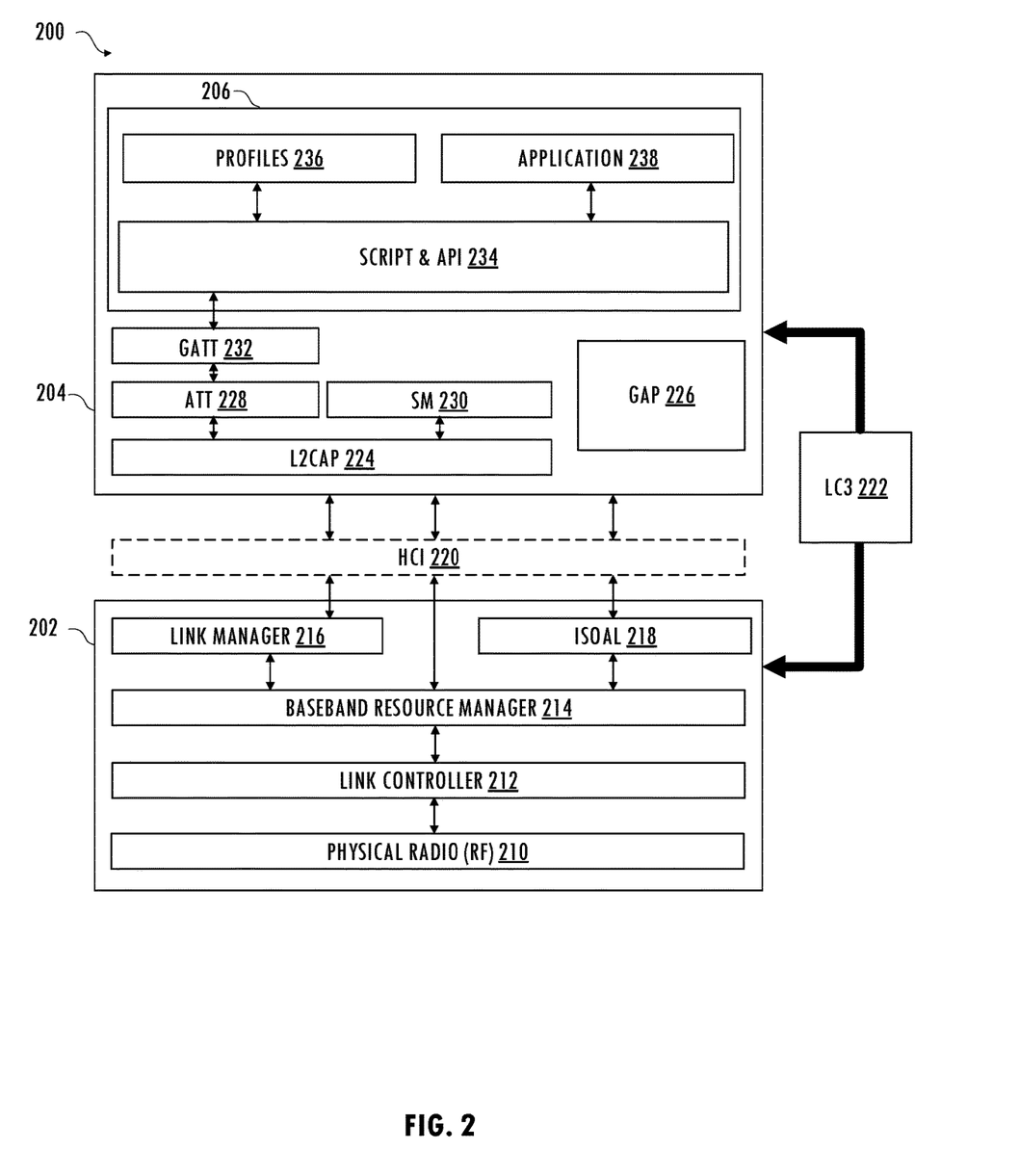
FIG. 2 illustrates a functional block diagram of an exemplary communications device configured for BLE communications.

Referring to FIG. 2, each wireless communications device of a BLE communications system implements the BLE architecture, e.g., implemented using separate integrated circuit devices for controller 202 and host 204. In some embodiments, wireless communications device 200 incorporates functionality of controller 202 and host 204 in a single integrated circuit device. Controller 202 includes physical radio (RF) 210 and link controller 212, which are responsible for sending packets over the air by defining the use of a radio, including modulation schemes, frequency bands, channel use, and transmitter and receiver characteristics, e.g., as described in Bluetooth Core Specification Version 5.3, Vol. 6: Low Energy Controller. Physical radio (RF) 210 transmits and receives packets of information on the physical channel and transforms a stream of data to and from the physical channel and the baseband into required formats. The physical layer defines the use of a radio (e.g., a transmitter and receiver), including modulation schemes, frequency bands, channel use, and transmitter and receiver characteristics. Link controller 212 implements the link layer protocol, which defines the air interface packet formats, bit stream processing procedures, a state machine and protocols of over-the-air communication, and link control. Link controller 212 encodes and decodes packets from a data payload and parameters related to a physical channel, logical transport, and logical link.

Baseband resource manager 214 negotiates access contracts, i.e., commitments to deliver a predetermined QoS that is required by a user application to provide expected performance. Baseband resource manager 214 also includes a scheduler that grants time on physical channels to entities that have negotiated an access contract. Isochronous Adaptation Layer (ISOAL) 218 converts between upper layer data units and lower layer data units, e.g., using fragmentation and recombination or segmentation and reassembly operations. ISOAL allows the size of isochronous data packets as created and consumed by upper layers of the architecture to be different from the size of data packets used by the link layer. In addition, ISOAL allows an upper layer to use timing intervals that differ from those used by the link layer so that the rate of Service Data Units (SDUs) exchanged with the upper layers is not the same as the rate with which they are exchanged with the link layer. Link manager 216 creates, modifies, and releases logical links (and associated logical transports, if required) and updates parameters related to physical links between devices. In an embodiment, wireless communications device 112 implements Host-to-Controller Interface (HCI) 220, which is a standard service interface.

In an embodiment, host 204 includes Generic Audio Framework (GAF) 206, Logical Link Control and Adaptation Protocol (L2CAP) resource manager 224, Attribute Protocol (ATT) 228, Generic Attribute Protocol (GATT) 232, Generic Access Profile (GAP) 226, and Security Manager (SM) 230. L2CAP resource manager 224 manages ordering of submission of PDU fragments and some relative scheduling between channels to ensure that L2CAP channels with QoS commitments are not denied access to the physical channel due to controller resource exhaustion. L2CAP resource manager 224 polices traffic to ensure that applications submit L2CAP SDUs within bounds of negotiated QoS settings. In an exemplary wireless communications device 112, GATT 232 defines the way that two BLE devices communicate data using services and characteristics. In an embodiment, GATT 232 uses a generic data protocol called the ATTribute protocol (ATT) 228, which is used to store services, characteristics and related data in a simple lookup table using 16-bit identifiers for each entry in the table. SM 230 implements a peer-to-peer protocol for generating encryption keys and identity keys and generates random addresses and resolves random addresses to known device identities. SM 230 provides stored keys to controller 202 for encryption and authentication during encryption or pairing procedures. GAP 226 represents base functionality common to all Bluetooth devices, e.g., modes and access procedures used by transports, protocols, and application profiles. GAP services include device discovery, connection modes, security authentication, associate models and service discovery. Generic Audio Framework (GAF) 206 includes Script and API 234, application 238, and profiles 236, which adds application specific information to GAF 206. For example, profiles 236 includes hearing access profile (HAP) and hearing access service (HAS), which provide applications for a hearing aid ecosystem, profiles 236 includes telephony and media audio profile (TMAP), which specifies higher quality codec settings and more complex media and telephony control, and profiles 236 includes public broadcast profile (PBP), which facilitates selecting globally interoperable broadcast systems.

Low complexity communications codec (LC3) 222 includes a codec for high performance telephony speech, wideband and super-wideband speech, and high-quality audio. LC3 222 encodes audio data into different channel streams (e.g., stereo is encoded as separate left and right streams). LC3 222 provides audio data as SDUs to the link layer, which generates PDUs for isochronous data streams. The link layer provides SDUs based on received PDUs to LC3 222 for decoding.

In an embodiment of wireless communications system 100, wireless communications device 102 is configured as a central device, which sets up schedules, manages isochronous streams, and sends commands. Wireless communications device 112 and wireless communications device 122 are configured as peripheral devices, which participate in streams and respond to commands. In an embodiment, wireless communications device 112 and wireless communications device 122 are small, wearable devices that communicate with wireless communications device 102 when they come within a predetermined distance from wireless communications device 102. In an embodiment, wireless communications device 102 is a smartphone that sends multiple, independent, synchronized audio streams to wireless communications device 112 and wireless communications device 122 (e.g., smart speakers, headphones, or earbuds). In other embodiments, wireless communications device 112 and wireless communications device 122 are wireless speakers that are configured as different channels (e.g., front left channel, back left channel, front right channel, or back right channel).

Figure 3A:
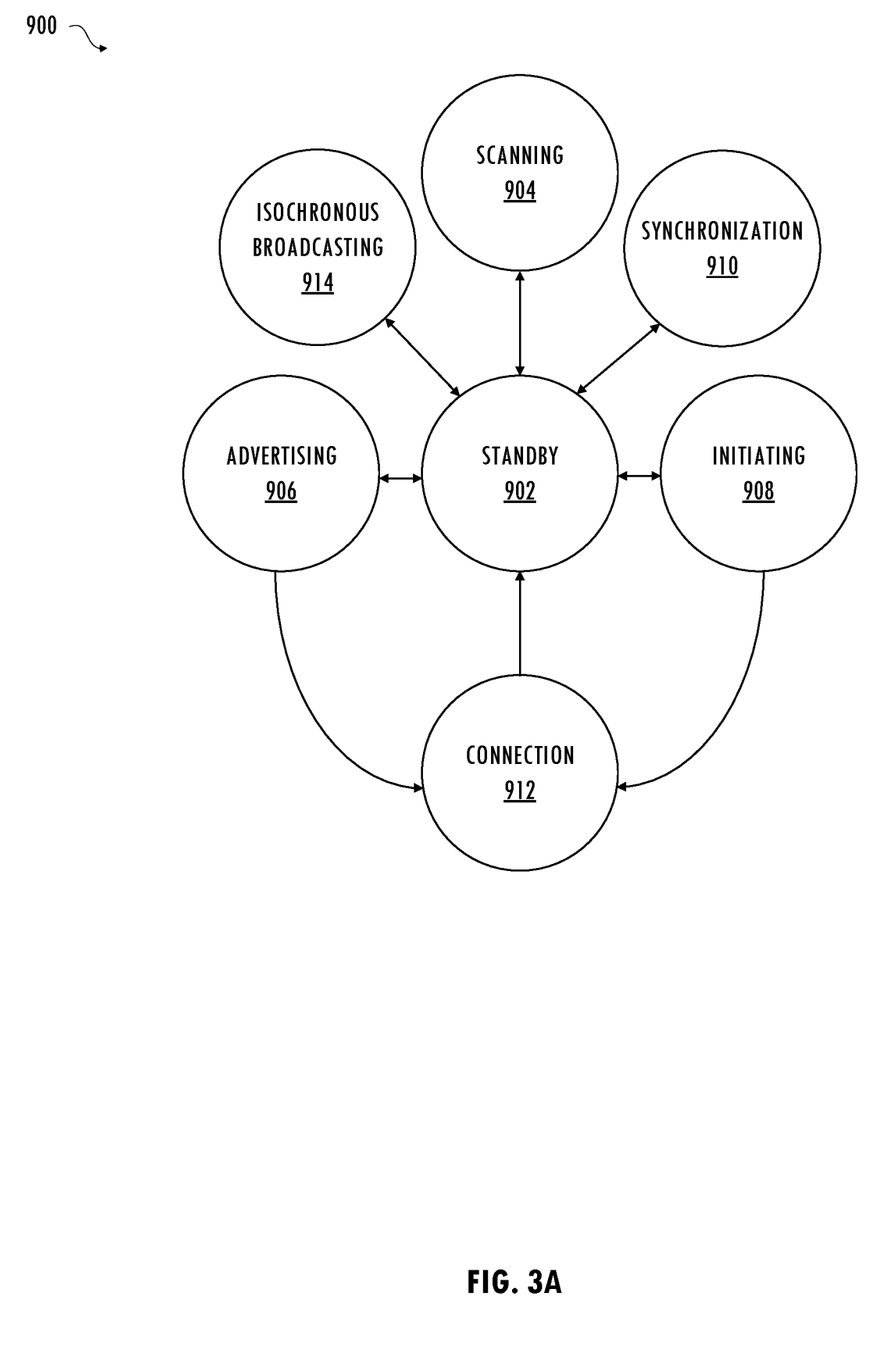
FIG. 3A illustrates an exemplary state diagram of the link layer implemented by link controller 212 of FIG. 2.

FIG. 3A illustrates an exemplary link layer state machine 900 including standby state 902, scanning state 904 or advertising state 906, initiating state 908, synchronization state 910, connection state 912, and isochronous broadcasting state 914. Only one state of a link layer is active at a time. Link layer state machine 900 can enter standby state 902 from any other state. In standby state 902, the link layer does not transmit any packets. Link layer state machine 900 may enter advertising state 906 from standby state 902. In advertising state 906, the link layer transmits advertising physical channel packets and may listen to and respond to a response triggered by the advertising physical channel packets. Link layer state machine 900 may enter scanning state 904 from standby state 902. In scanning state 904, the link layer listens for advertising physical channel packets from devices that are advertising. Link layer state machine 900 may enter initiating state 908 from standby state 902. In initiating state 908, the link layer listens for advertising physical channel packets from a specific device and responds to these packets to initiate a connection with another device. Link layer state machine 900 may enter synchronization state 910 from standby state 902. In synchronization state 910, the link layer listens for periodic channel packets forming a specific periodic advertising train transmitted by a specified device (e.g., a host may direct the link layer to listen for isochronous data packets coming from a specified device that is transmitting a broadcast isochronous group (BIG)). Link layer state machine 900 may enter isochronous broadcasting state 914 from standby state 902. In isochronous broadcasting state 914, the link layer transmits isochronous data packets on an isochronous physical channel.

Link layer state machine 900 may enter connection state 912 from initiating state 908 or advertising state 906. When entering connection state 912 from initiating state 908, the connection state is the central role (i.e., the device is configured as a central device) and the link layer communicates with another device having a connection state of a peripheral role (i.e., the other device is configured as a peripheral device) and defines the timings of transmissions. When entering connection state 912 from advertising state 906, the connection state is the peripheral role and the link layer communicates with a single other device configured in the central role. In some embodiments, during connection state 912, the link layer transmits data physical channel PDUs in connection events. A connection event typically contains at least one packet sent by the central device. The same data channel index is used for all packets in a connection event. In some embodiments, during a connection event, the central device and peripheral device alternate sending and receiving packets.

In an embodiment, the link layer uses one physical channel (RF channel) at a time. Each transmission on a physical channel is associated with corresponding access address. In general, two devices use a shared physical channel to communicate with each other. Whenever the link layer of a device is synchronized to the timing, frequency, and access address of a physical channel, the link layer is connected on the data physical channel or synchronized to a periodic physical channel or an isochronous physical channel regardless of whether it is actively involved in communications over the channel. The link layer generates a new access address for each CIS it creates. Connections are exclusive, i.e., a peripheral device can be connected to only one central device at a time. As soon as a peripheral device connects to a central device, it stops advertising itself and other devices are no longer able to see it or connect to it until an existing connection is broken.

Figure 3B:
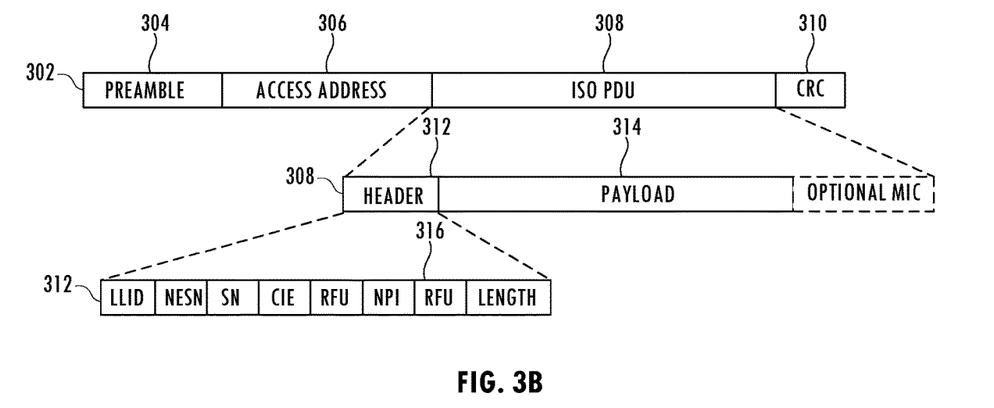
FIG. 3B illustrates a format of a CIS packet.

FIG. 3B illustrates an exemplary BLE CIS radio packet for transmitting data by a wireless communications device. CIS packet 302 includes preamble 304 (e.g., 1 or 2 octets), access address 306 (e.g., 4 octets), isochronous PDU 308 (e.g., 2-257 octets) and cyclic redundancy check (CRC) 310 (e.g., 3 octets). Isochronous PDU 308 includes header 312 (e.g., 16 bits), payload 314 (e.g., 0-251 octets), and an optional Message Integrity Check (e.g., 32 bits). Header 312 includes Link Layer ID (2 bits), Next Expected Sequence Number (e.g., 1 bit), Sequence Number (1 bit), Close Isochronous Event bit (e.g., 1 bit), Reserved for Future Use bits (e.g., 2 non-contiguous bits), Null Payload Indicator (e.g., 1 bit), and Length (e.g., 8 bits). The CIE bit indicates whether a source device has received an acknowledgment from the sink device confirming that the packet was successfully received by the sink device so that the source device will stop further retransmissions of that PDU. An early CIE bit allows the sink device to go to sleep until the next Isochronous Interval, allowing the source device to perform other tasks. In an embodiment, in response to the CIE bit being set, the sink device saves power by turning off its receiver until the next isochronous interval. The NPI bit indicates whether the payload is a null PDU and there is no data being transmitted in the packet.

Figure 3C:
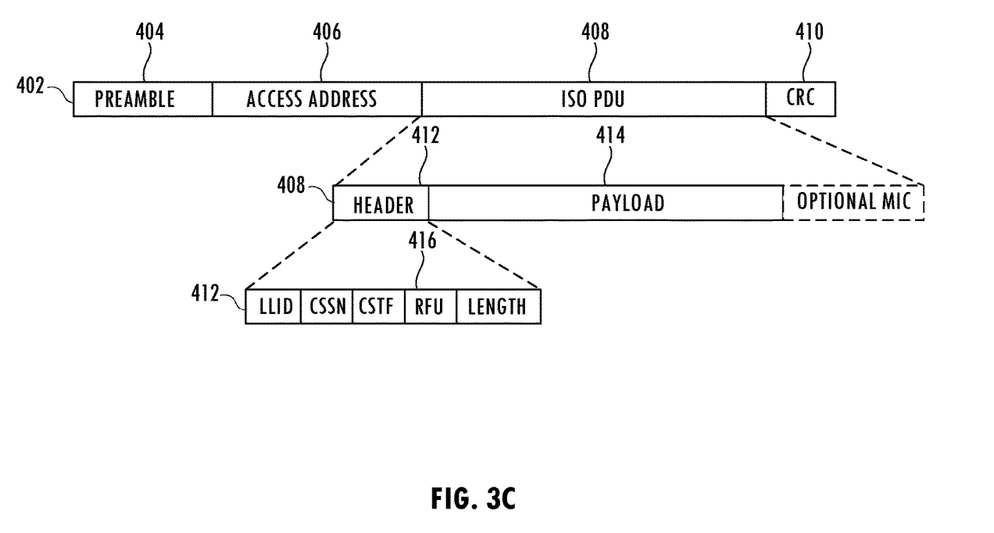
FIG. 3C illustrates a format of a BIS packet.

FIG. 3C illustrates an exemplary BLE BIS radio packet for transmitting data by a wireless communications device. BIS packet 402 includes preamble 404, access address 406, ISO PDU 408, and CRC 410, which are similar to the corresponding fields of a CIS packet described above. In addition, header 412, payload 414, and the optional MIC field are similar to the corresponding fields in the CIS packet. However, BIS packet 402 has a simpler header since the SN and NESN flow control bits are not needed for BIS packets. Header 412 includes Link Layer ID (e.g., 2 bits), Control Subevent Sequence Number (e.g., 3 bits), Control Subevent Transmission Flag (e.g., 1 bit), Reserved for Future Use bits (e.g., 2 bits), and Length (e.g., 8 bits). The CSTF bit signals that a control subevent is present in that BIS event. The control subevent provides control information to every sink device and is used to inform the sink device of events such as a change in hopping sequence.

Figure 4:
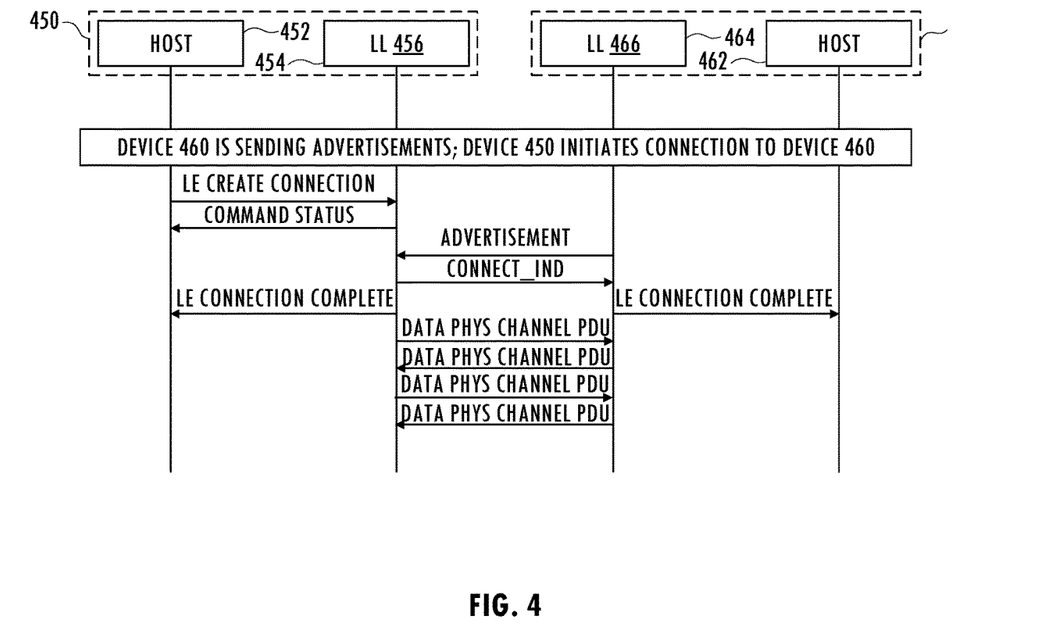
FIG. 4 illustrates an exemplary timing diagram for initiating a connection between two devices in a conventional BLE communications system.

Referring to FIG. 4, in at least one embodiment, wireless communications device 450 includes host 452 and controller 454 implementing link layer 456 and wireless communications device 460 includes host 462 and controller 464 implementing link layer 466. In an exemplary protocol, host 452 configures link layer 456 in an initiating state (e.g., by sending an LE CREATE CONNECTION PDU), and host 462 configures link layer 466 in an advertising state. Link layer 456 listens for advertising PDUs. In an advertising state, link layer 466 transmits an advertisement PDU. In response to receiving an advertisement PDU, wireless communications device 450 initiates a connection to wireless communications device 460 (e.g., sending a CONNECT_IND PDU). A successful initiation results in link layer 456 sending an LE CONNECTION COMPLETE PDU to host 452 and link layer 466 sending the LE CONNECTION COMPLETE PDU to host 460, and wireless communications device 450 and wireless communications device 460 communicate DATA PHYS CHANNEL PDUs. When wireless communications device 450 and wireless communications device 460 are in a connection, either wireless communications device can transmit data.

Figure 5:
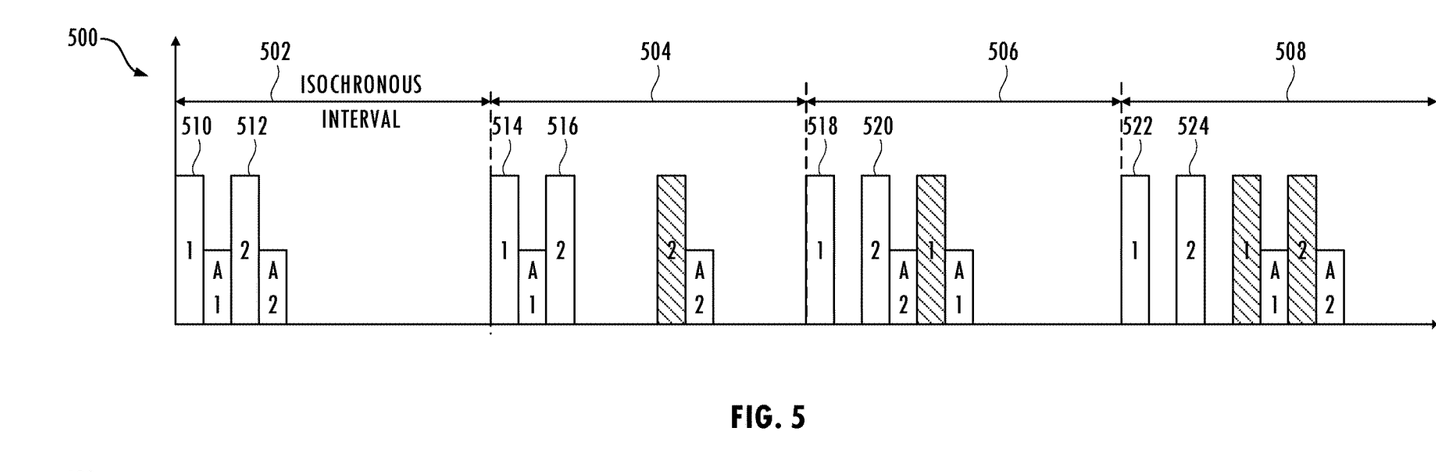
FIG. 5 illustrates exemplary timing diagrams for communication of data between a source device and multiple sink devices using synchronized CIS packets.

Referring to FIG. 5, after establishing a connection, a BLE audio source transmits CIS streams 500 in CIS intervals 502, 504, 506, and 508. The BLE audio source device transmits first streams of synchronized audio data including a first CIS (e.g., right audio data) and a second CIS (e.g., left audio data) to a first BLE audio sink device. The BLE audio source device also transmits second streams of synchronized audio data including a third CIS (e.g., right audio data) and a fourth CIS (e.g., left audio data). The first streams and second streams can be identical audio streams, i.e., the first CIS and the third CIS carry identical audio data and the second CIS and the fourth CIS carry identical audio data. In CIS interval 502, the BLE audio source device transmits audio packet 510 of CIS 1 and audio packet 512 of CIS 2 and receives corresponding acknowledgement packets A1 and A2 from corresponding BLE audio sink devices. No retransmission occurs. In CIS interval 504, the BLE audio source device transmits audio packet 514 of CIS 1 and audio packet 516 of CIS 2 and receives only acknowledgement packet A1 corresponding to audio packet 514. Therefore, the BLE audio source retransmits audio packet 516 (indicated by hatching) and receives acknowledgement packet A2. In CIS interval 506, the BLE audio source device transmits audio packet 518 of CIS 1 and audio packet 520 of CIS 2 and receives only acknowledgement packet A2 corresponding to audio packet 520. Therefore, the BLE audio source device retransmits audio packet 518 (indicated by hatching) and the BLE audio source device receives acknowledgement packet A1 from a corresponding BLE audio sink device. In CIS interval 508, after transmitting audio packet 522 of CIS 1 and audio packet 524 of CIS 2, the BLE audio source device receives no acknowledgement packets from the BLE audio sink devices. Therefore, the BLE audio source device retransmits audio packet 522 of CIS 1 and audio packet 524 of CIS 2 (indicated by hatching). The BLE audio source device receives acknowledgement packets A1 and A2 from corresponding BLE audio sink devices.

Figure 6:
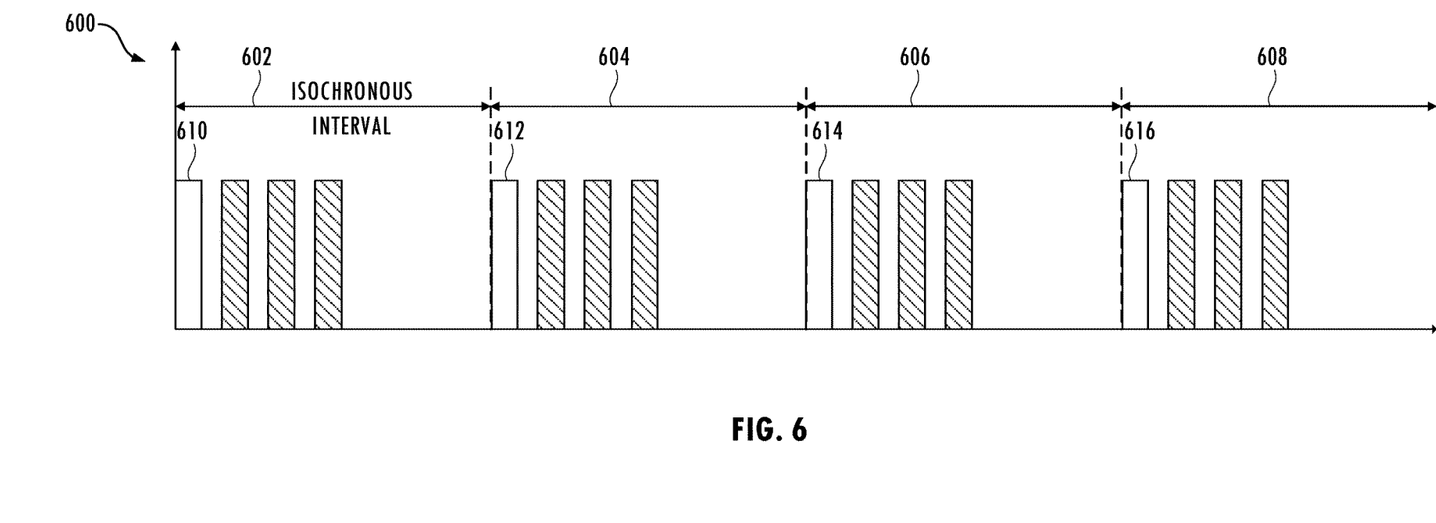
FIG. 6 illustrates exemplary timing diagrams for communication of data between a source device and multiple sink devices using BIS packets.

Referring to FIG. 6, a BLE audio source transmits BIS stream 600 in BIS intervals 602, 604, 606, and 608. The BLE audio source device transmits broadcast audio packets 610, 612, 614, and 616 to multiple BLE audio sink devices. Each broadcast audio packet is followed by three retransmissions of the broadcast audio packet (indicated by hatching), regardless of whether any of the BLE audio sink devices receive the packets.

Referring to FIGS. 5 and 6, CIS has a more controlled retry mechanism than BIS. The CIS retry mechanism avoids redundant transmissions to a BLE audio sink device, but CIS generates redundant transmit streams when multiple BLE audio sink devices are listening to the same audio stream causing power and airtime inefficiencies. BIS reduces redundant transmit streams when multiple BLE audio sink devices (e.g., more than one BLE audio sink device) are listening to same audio stream. However, BIS can generate unnecessary, redundant retransmissions that cause power and airtime inefficiencies.

A retry technique reduces power consumption for BLE applications (e.g., BLE audio). The retry technique combines features of a BIS and a CIS to reduce or eliminate redundant transmit streams when multiple BLE sink devices are listening to the same data stream and reduces or eliminates redundant retransmissions when multiple BLE sink devices are listening to the same audio stream. The retry technique uses a Hybrid Isochronous Group (HIG) defined by a BLE source device to establish multiple synchronized BISes and CISes that form the HIG. The BISes are used to transmit data packets of unique audio streams from a BLE source device to a BLE sink device. For example, multiple BISes are used to transmit synchronized isochronous streams of data. The CISes provide feedback (e.g., acknowledgements) to the BLE source device from different BLE sink devices listening to the BISes. The CISes of an HIG include only acknowledgement packets and therefore are smaller than data packets of the BISes. In at least one embodiment, the CIS packet exchange is a Null packet exchange. Thus, the CIS packet exchange of an HIG is likely to consume less airtime and power as compared to corresponding data packets of the BISes. The source device retransmits an audio packet of a BIS if one or more sink devices of the CIS does not acknowledge reception of the audio packet in the BIS. The retry technique assumes that the number of BLE sink devices likely to listen to the audio streams is known to the BLE source, and the number of those listening devices is relatively small (e.g., 4-5) and that the number of BLE sink devices (e.g., one or more) likely to listen to common data streams are known to the BLE source.

Figure 7:
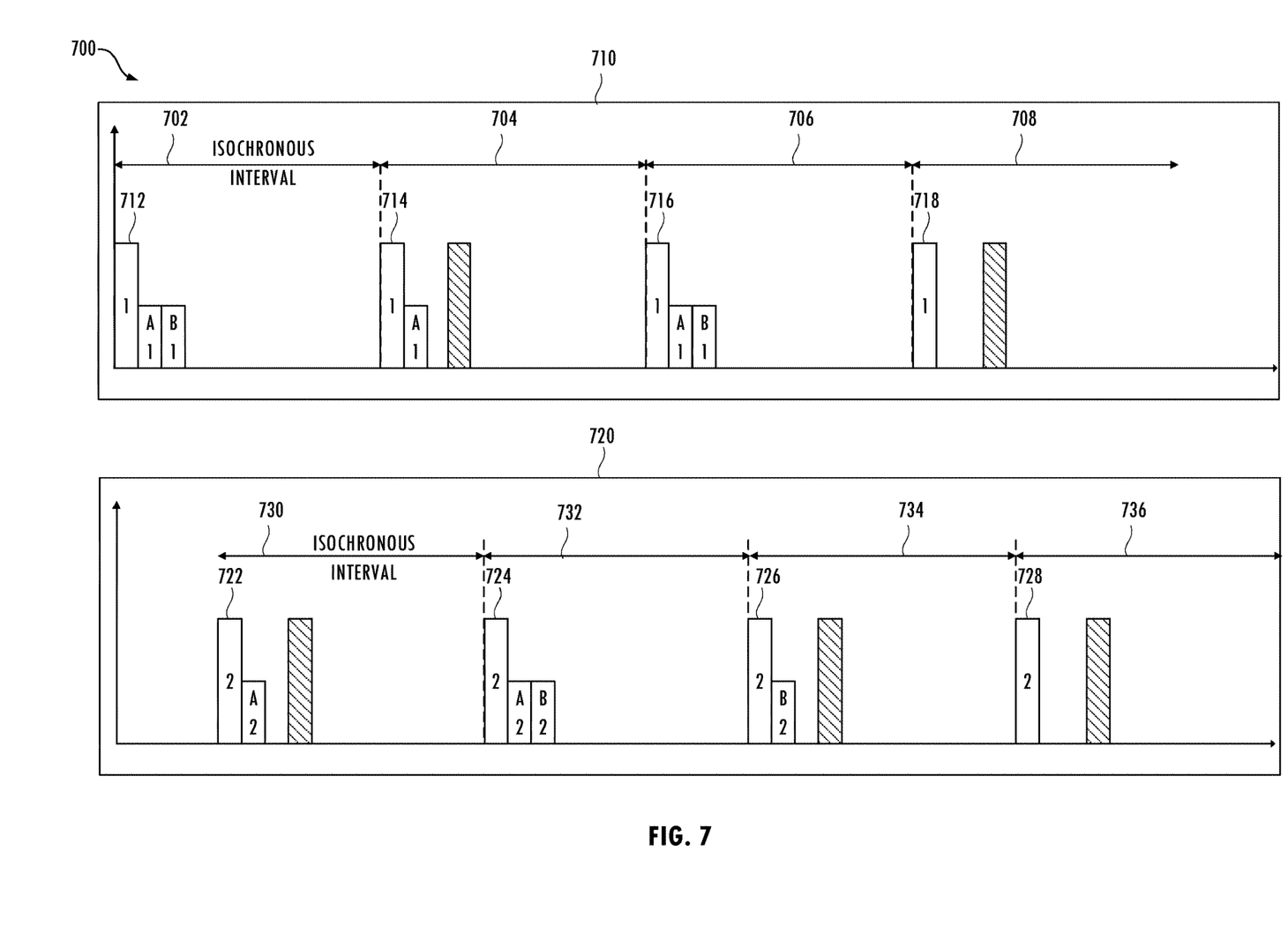
FIG. 7 illustrates exemplary timing diagrams for communication of data between a source device and multiple sink devices using a hybrid isochronous group consistent with at least one embodiment of the invention.

Referring to FIG. 7, an HIG includes multiple synchronized isochronous data streams. For example, HIG 700 includes a left audio stream 710 and a right audio stream 720. Left audio stream 710 includes BIS 1, which corresponds to transmissions of left audio data packets from a BLE source to each of BLE sink devices A and B. Left audio stream 710 of HIG 700 also includes CIS streams A1 and B1, which correspond to feedback from BLE sink devices A and B, respectively, to the BLE source device in response to receiving left audio data packets. Right audio stream 720 includes BIS 2, which corresponds to transmissions of right audio data packets from the BLE source device to BLE sink devices A and B. Right audio stream 720 of HIG 700 also includes CIS streams A2 and B2, which correspond to feedback from BLE sink devices A and B, respectively, to the BLE source device in response to receiving right audio data packets.

In HIG interval 702, the BLE source device transmits audio packet 712 of BIS stream 1. Since the BLE source device receives acknowledgements A1 and B1 from BLE sink devices A and B, respectively, the BLE source device does not retransmit the packet. In HIG interval 704, the BLE source device transmits audio packet 714 of BIS 1 and receives only acknowledgement A1 from BLE sink device A. Since the BLE source device does not receive an acknowledgment from BLE sink device B, the BLE source device retransmits audio packet 714 of BIS 1 (indicated by hatching). In HIG interval 706, the BLE source device transmits audio packet 716 and receives acknowledgement A1 and B1, from sink devices A and B, respectively. Therefore, the BLE source device does not retransmit audio packet 716. In HIG interval 708, after transmitting audio packet 718 of BIS 1 and receiving no acknowledgements, the BLE source device retransmits audio packet 718 (as indicated by hatching).

In HIG interval 730, the BLE source transmits audio packet 722 of BIS 2 and receives only acknowledgement A2, corresponding to BLE sink device A. Therefore, the BLE source device retransmits audio packet 722 (indicated by hatching). In HIG interval 732, after transmitting audio packet 724 of BIS 2, the BLE source device receives acknowledgement A2 from BLE sink device A, and acknowledgement B2 from BLE sink device B. Therefore, the BLE source device does not retransmit audio packet 724. In HIG interval 734, the BLE source device transmits audio packet 726 and receives acknowledgement B2 from BLE device A. The BLE source device receives nothing from BLE sink device B. Therefore, the BLE source device retransmits audio packet 726 (indicated by hatching). In HIG interval 736, no acknowledgement follows transmission of audio packet 728. Therefore, the BLE source device retransmits audio packet 728 (indicated by hatching).

In at least one embodiment, the acknowledgements are NULL packet exchanges between BLE sink devices and a BLE source device to indicate successful reception of an audio data packet. Each NULL packet of the exchange does not include any payload. The absence of a NULL packet received by a BLE source device from a BLE sink device indicates request for retransmission. In at least one embodiment, NACK packets are used to indicate that an expected audio data packet is not received by a BLE sink device and the acknowledgement is the absence of receiving a NACK packet by a BLE source device. In at least one embodiment, the acknowledgements are unidirectional NULL packets instead of an exchange of NULL packets to reduce the transmission of NULL packets. A CIS may only exchange a NULL packet from a BLE sink device to a BLE source device to indicate successful reception of a BIS packet and the absence of a NULL packet from a BLE sink device indicates a request for retransmission. In some embodiments, the acknowledgement indicator is a poll, NULL packet, or other indicator defined by the Bluetooth Core Specification. In other embodiments, an acknowledgement is a vendor-specific indicator that is as small as a preamble and an access code.

Figure 8:
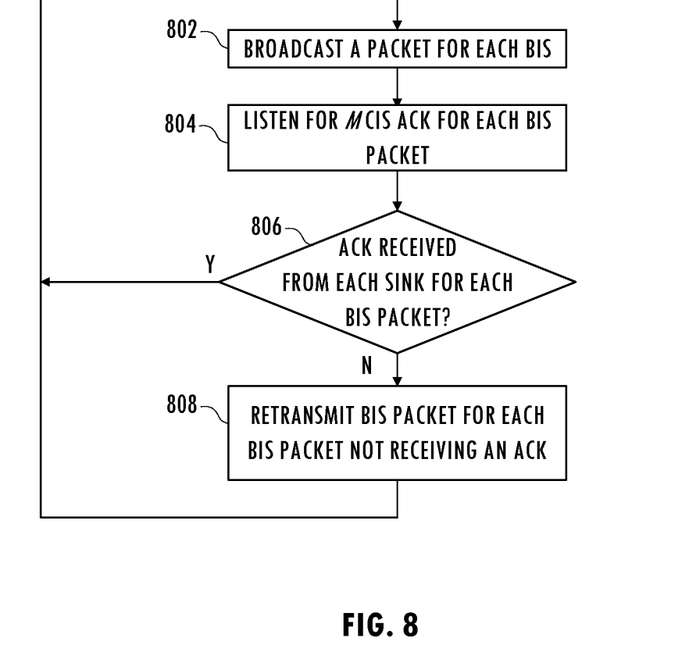
FIG. 8 illustrates an exemplary information and control flow for a source device using a hybrid isochronous group communicated between a source device and multiple sink devices consistent with at least one embodiment of the invention.
Figure 9:
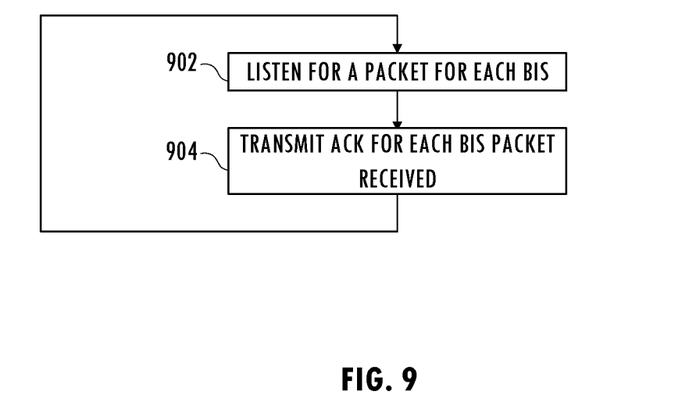
FIG. 9 illustrates an exemplary information and control flow for a sink device using a hybrid isochronous group communicated between a source device and multiple sink devices consistent with at least one embodiment of the invention.

Referring to FIG. 8, in at least one embodiment, a BLE source device broadcasts a packet for each BIS intended to be received by M BLE sink devices (802). The source device listens for M CIS acknowledgement packets (i.e., one acknowledgement packet from each of the M BLE sink devices) for each BIS (804). If the BLE source device receives one acknowledgement packet from each of the M BLE sink devices (806), then the BLE source device is finished with that packet and corresponding HIG event. If the BLE source device does not receive an acknowledgement packet from each of the M sink devices, then the BLE source device retransmits the BIS packet (808). Referring to FIG. 9, in at least one embodiment, a BLE sink device listens for a packet for each BIS intended to be received by the BLE sink device (902) and transmits an acknowledgement for each BIS packet received by the BLE sink device (904).

Thus, retry techniques that reduce or eliminate redundant transmit streams and redundant retransmissions when multiple sink devices are listening to the same audio stream(s) have been described. The retry techniques reduce power consumption and reduce airtime usage. The retry techniques may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

The description of the invention set forth herein is illustrative and is not intended to limit the scope of the invention as set forth in the following claims. For example, while the invention has been described in an embodiment in a BLE audio system, one of skill in the art will appreciate that the teachings herein can be utilized with communications of other types of isochronous data. The terms "first," "second," "third," and so forth, as used in the claims, unless otherwise clear by context, distinguish between different items in the claims and do not otherwise indicate or imply any order in time, location, or quality. For example, "a first received signal," and "a second received signal," do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for communicating between devices using a wireless communications interface, the method comprising:
communicating data packets using a hybrid isochronous group including a plurality of broadcast isochronous streams from a source device to a plurality of sink devices, and including for each broadcast isochronous stream, a group of connected isochronous streams including a connected isochronous stream to the source device from each of the plurality of sink devices,
wherein the broadcast isochronous streams communicate the data packets and the connected isochronous streams communicate acknowledgements of receiving the data packets.

2. The method as recited in claim 1 further comprising:
for each broadcast isochronous stream of the plurality of broadcast isochronous streams:
broadcasting a first data packet of the broadcast isochronous stream by the source device;
listening by the source device for an acknowledgment from each of the plurality of sink devices; and
selectively retransmitting the first data packet by the source device based on whether an acknowledgement is received from each of the plurality of sink devices.

3. The method as recited in claim 2 wherein the acknowledgement is a unidirectional null packet received by the source device from a corresponding sink device of the plurality of sink devices.

4. The method as recited in claim 2 wherein the acknowledgement is a null packet exchange between the source device and a corresponding sink device of the plurality of sink devices.

5. The method as recited in claim 2 wherein the acknowledgement is a unidirectional predetermined packet received by the source device from a corresponding sink device of the plurality of sink devices, the unidirectional predetermined packet consuming less airtime and power consumption than the first data packet.

6. The method as recited in claim 2 wherein the acknowledgement is an absence at the source device of a negative acknowledgement packet received from a corresponding sink device of the plurality of sink devices.

7. The method as recited in claim 1 wherein the data packets include audio data and the plurality of broadcast isochronous streams includes a left channel audio stream and a right channel audio stream.

8. The method as recited in claim 1 wherein the wireless communications interface is a Bluetooth Low Energy communications interface.

9. A wireless communications system comprising:
a source device comprising:
a radio frequency (RF) transceiver configured to transmit and receive radio frequency signals; and
data processing circuitry configured to provide a plurality of broadcast isochronous streams to the RF transceiver and to detect for each broadcast isochronous stream, a group of connected isochronous streams including a connected isochronous stream from each of a plurality of sink devices,
wherein the plurality of broadcast isochronous streams communicates data packets to the plurality of sink devices and the group of connected isochronous streams communicates acknowledgements from the plurality of sink devices, and
wherein the plurality of broadcast isochronous streams and the group of connected isochronous streams included for each broadcast isochronous stream of the plurality of broadcast isochronous streams form a hybrid isochronous group.

10. The wireless communications system as recited in claim 9 wherein the data processing circuitry comprises:
a storage element; and
a processor configured to execute instructions stored in the storage element, the instructions being executable by the processor to cause the processor to define the hybrid isochronous group.

11. The wireless communications system as recited in claim 9 further comprising:
a sink device of the plurality of sink devices, wherein the sink device comprises:
a second RF transceiver configured to transmit and receive the data packets using radio frequency signals; and
second data processing circuitry configured to transmit for each broadcast isochronous stream of the plurality of broadcast isochronous streams, the connected isochronous stream corresponding to the sink device in response to detecting a first data packet of a corresponding broadcast isochronous stream of the plurality of broadcast isochronous streams.

12. The wireless communications system as recited in claim 9 wherein each of the acknowledgements is a unidirectional null packet received by the source device from a corresponding sink device of the plurality of sink devices.

13. The wireless communications system as recited in claim 9 wherein each of the acknowledgements is a null packet exchange between the source device and a corresponding sink device of the plurality of sink devices.

14. The wireless communications system as recited in claim 9 wherein each of the acknowledgements is a unidirectional predetermined packet received by the source device from a corresponding sink device of the plurality of sink devices and the unidirectional predetermined packet consumes less airtime and power consumption than a corresponding data packet of the data packets.

15. The wireless communications system as recited in claim 9 wherein each of the acknowledgements is an absence at the source device of a negative acknowledgement (NACK) packet received from a corresponding sink device of the plurality of sink devices.

16. The wireless communications system as recited in claim 9 wherein the data packets include audio data and the plurality of broadcast isochronous streams includes a left channel audio stream and a right channel audio stream.

17. The wireless communications system as recited in claim 9 wherein the wireless communications system implements a Bluetooth Low Energy communications protocol.

18. A wireless communications system comprising:
a sink device comprising:
a radio frequency (RF) transceiver configured to transmit and receive radio frequency signals; and
data processing circuitry configured to detect a plurality of broadcast isochronous streams from the RF transceiver and to provide to the RF transceiver for each broadcast isochronous stream, a connected isochronous stream,
wherein the plurality of broadcast isochronous streams communicates data packets to the sink device and the connected isochronous streams communicate acknowledgements from the sink device.

19. The wireless communications system as recited in claim 18 further comprising:
an additional sink device,
wherein the data packets include audio data, the plurality of broadcast isochronous streams includes a left channel audio stream and a right channel audio stream, and the sink device and the additional sink device correspond to a left speaker and a right speaker.

20. The wireless communications system as recited in claim 18,
wherein each of the acknowledgements is a unidirectional predetermined packet, and
wherein the unidirectional predetermined packet consumes less airtime and power consumption than a data packet.

* * * * *